United States Patent
Ohtsuka

(10) Patent No.: US 6,428,446 B1
(45) Date of Patent: Aug. 6, 2002

(54) CONTROL APPARATUS FOR SYNCHROMESH TYPE AUTOMATIC TRANSMISSION SYSTEM

(75) Inventor: Toshio Ohtsuka, Hyogo-ken (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2 days.

(21) Appl. No.: 09/784,180

(22) Filed: Feb. 16, 2001

(30) Foreign Application Priority Data

Jul. 25, 2000 (JP) ........................................ 2000-223542

(51) Int. Cl.$^7$ .............................................. B60K 41/26
(52) U.S. Cl. ...................... 477/94; 192/220.1; 74/336 R
(58) Field of Search .............................. 477/92, 94, 96; 74/336 R; 192/220, 220.1

(56) References Cited

U.S. PATENT DOCUMENTS

| | | | | |
|---|---|---|---|---|
| 4,829,435 A | * | 5/1989 | Isono | 192/222 |
| 5,016,495 A | * | 5/1991 | Takizawa | 192/220 |
| 5,054,336 A | * | 10/1991 | Takizawa | 192/220 |
| 6,003,396 A | * | 12/1999 | Bellinger et al. | 477/120 |

FOREIGN PATENT DOCUMENTS

JP          63-270252          11/1988    ........... B60K/41/02

OTHER PUBLICATIONS

Abstract 63–270252 Nov. 8, 1988.

* cited by examiner

Primary Examiner—Charles A Marmor
Assistant Examiner—Ankur Parekh
(74) Attorney, Agent, or Firm—Sughrue Mion, PLLC

(57) ABSTRACT

A control apparatus for a synchromesh type automatic transmission system of a motor vehicle capable of suppressing speed-stage downshift operation which may occur successively upon application of sudden braking as well as occurrence of a gear squeaking phenomenon and shock due to speed change brought about by the downshift operation. The control apparatus includes a shift/select actuator of a multi-stage speed change gear unit (3), a brake switch an accelerator pedal position sensor, an output rotation speed sensor, and a speed stage control means for controlling the shift/select actuator on the basis of detection signals outputted from the sensors. When it is decided that the brake switch is in a closed state and that the deceleration determined arithmetically on the basis of the vehicle speed is not greater than a predetermined value the multi-stage speed change gear unit is shifted to a neutral position and thereafter the decision as to the speed change is suspended.

3 Claims, 7 Drawing Sheets

CONTROL APPARATUS FOR SYNCHROMESH TYPE AUTOMATIC TRANSMISSION SYSTEM

BACKGROUND OF THE INVENTION

1. Field of the Invention

The present invention generally relates to a control apparatus for a synchromesh type automatic transmission system of an internal combustion engine mounted on a motor vehicle, which is designed for automatically changing over speed stages of a synchromesh type multi-stage speed change gear unit incorporated in the automatic transmission system. More particularly, the present invention is concerned with the control apparatus for the synchromesh type automatic transmission system which is designed for suppressing effectively shock and gear squeaking phenomena which may take place in accompanying successive speed downshifts or speed changes from high to low speed stage upon application of sudden braking.

2. Description of Related Art

The control apparatus for the synchromesh type automatic transmission system such as mentioned above is known as disclosed, for example, in Japanese Patent Application Laid-Open Publication No. 270252/1988 (JP-A-63-270252). In the automatic transmission system known heretofore, transmission of the output torque or power of an engine such as an internal combustion engine to a gear-mesh type multi-stage speed change gear unit is controlled through on/off operation of an electromagnetic clutch.

In the synchromesh type automatic transmission system disclosed in the publication cited above, the speed stage (or speed gear) changeover operation is realized by driving or actuating correspondingly a three position hydraulic cylinder dedicated for selecting a speed stage and another three position hydraulic cylinder which is dedicated for shifting the multistage speed change gear unit to the selected speed stage.

More specifically, through combination of operations of a pair of electromagnetically controlled hydraulic values, a desired or target speed stage is selected by driving correspondingly the selection-dedicated three position hydraulic cylinder, whereon the multi-stage speed change gear unit is shifted to the selected speed stage with the aid of the shift-dedicated three position hydraulic cylinder which is actuated through the medium of another pair of electromagnetically controlled hydraulic valves.

In the speed stage changeover operation for changing the speed of a motor vehicle, the speed stage suited for the running state of the motor vehicle is determined by referencing a shift pattern set previously for the multi-stage speed change gear unit, as is well known in the art.

However, the conventional automatic transmission system suffers a problem that when braking is applied abruptly or suddenly (i.e., upon application of sudden braking) in the state where the motor vehicle is running at a high speed, e.g. at a fourth or fifth speed, the time taken for traversing a downshift pattern curve becomes short, as a result of which the downshift operation (i.e., shift operation from high to low speed stages) will take place successively. In the worst case, a succeeding downshift operation will occur before a preceding downshift operation has been completed.

Besides, because the sudden braking state mentioned above will remain effective continuously throughout the downshift operation, rotational synchronization will be established among the individual gears of the multi-stage speed change gear unit at an earlier time point when compared with ordinary downshift operation performed in response to manipulation of a shift lever by a driver of the motor vehicle, as a result of which uncomfortable phenomenon such as gear squeaking may take place.

As is apparent from the foregoing, the conventional synchromesh type automatic transmission system suffers the problem that when the sudden braking is applied in the state where the motor vehicle is running at a high speed, the downshift operation is effectuated successively, being accompanied with the gear squeaking phenomenon, as a result of which comfortableness of driving the motor vehicle is significantly impaired.

SUMMARY OF THE INVENTION

In the light of the state of the art described above, it is an object of the present invention to provide a control apparatus for a synchromesh type automatic transmission system of a motor vehicle which can effectively suppress occurrence of the gear squeaking phenomenon and shock brought about by the speed change downshift operation which may successively be effectuated upon application of sudden braking.

In view of the above and other objects which will become apparent as the description proceeds, the present invention is directed to a control apparatus for a synchromesh type automatic transmission system of a motor vehicle, which apparatus includes a shift/select actuator for driving a multi-stage speed change gear unit of a synchromesh type, a brake switch serving as a sensor for detecting a state where a brake pedal is depressed, an accelerator pedal position sensor for detecting a depression stroke of an accelerator pedal as an accelerator pedal depression stroke, an output rotation speed sensor for detecting a rotation speed of an output shaft of the multi-stage speed change gear unit as a vehicle speed, and a speed stage control means for making decision as to speed change on the basis of detection signals outputted from the sensors and controlling the shift/select actuator in dependence on the result of the decision, wherein a plurality of speed stages of the multi-stage speed change gear unit are automatically changed over from one to another. In the control apparatus for the synchromesh type automatic transmission described above, it is proposed according to a general aspect of the present invention that the speed stage control means is comprised of an acceleration/deceleration arithmetic means for determining arithmetically acceleration and deceleration of the motor vehicle on the basis of the vehicle speed, and a deceleration discriminating means for comparing the deceleration with a predetermined deceleration value, wherein when it is decided that the brake switch is in a closed state (on-state) and that the deceleration is not greater than the predetermined deceleration value, the multi-stage speed change gear unit is shifted to a neutral position (neutral state) and thereafter the decision as to the speed change is suspended.

By virtue of the arrangement described above, there can be implemented the control apparatus for the synchromesh type automatic transmission which is capable of suppressing gear squeaking phenomenon and shock which will otherwise take place in accompanying the speed-stage downshift operation upon application of sudden braking.

In a preferred mode for carrying out the invention, the speed change control means may be so designed that when it is decided that the brake switch is in the opened state (off-state) or the vehicle speed is zero, the speed stage control means clears the speed change decision suspend state to thereby allow the multi-stage speed change gear unit to be shifted to the speed stage determined on the basis of the shift pattern in dependence on the accelerator pedal depression stroke and the vehicle speed.

Owing to the arrangement described above, there can be implemented the control apparatus for the synchromesh type automatic transmission which is capable of restoring the automatic speed control conforming to the accelerator pedal depression stroke as soon as the sudden braking is released.

In another mode for carrying out the invention, the speed change control means may preferably be so designed that when it is decided that the brake switch is in the closed state (on-state) and that the deceleration is not greater than the predetermined deceleration value, a sudden braking application flag is set, wherein values of the sudden braking application flag in a preceding cycle and a current cycle, respectively, are referenced and when it is detected that the value of the sudden braking application flag has changed from a reset state to a set state, then a neutral control flag for shifting the multi-stage speed change gear unit to the neutral position and holding the multi-stage speed change gear unit in a neutral state is set, and wherein when it is detected that the value of the sudden braking application flag has changed from the set state to the reset state, a reset flag for allowing the multi-stage speed change gear unit to restore an ordinary speed change control operation from the neutral state is set.

With the arrangement described above, there can be implemented the control apparatus for the synchromesh type automatic transmission which is capable of suppressing the successive speed-stage downshift operation upon application of sudden braking and which can restore the automatic speed control operation rapidly upon releasing of the sudden braking.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
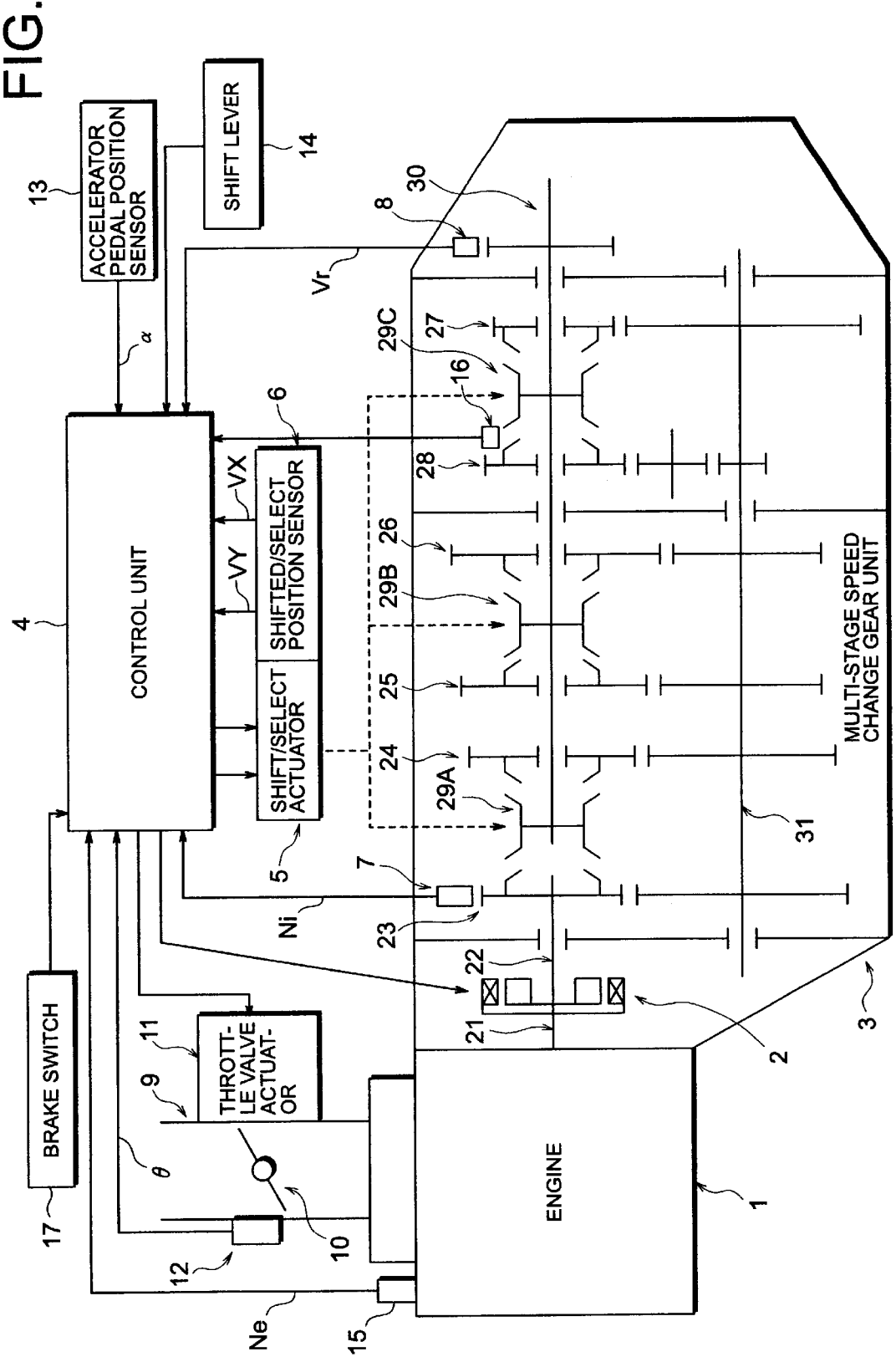
FIG. 1 is a block diagram showing schematically a structure of a synchromesh type automatic transmission system provided with a control apparatus according to an embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, referring to the drawings, description will be made of the control apparatus for a synchromesh type automatic transmission system according to a first embodiment of the present invention.

FIG. 1 is a block diagram showing generally and schematically a structure of a synchromesh type automatic transmission system provided with a control apparatus according to a first embodiment of the invention. As can be seen in the figure, a multi-stage speed change gear unit generally denoted by reference numeral 3 which constitutes the major part of the synchromesh type automatic transmission system is operatively coupled to a crank shaft 21 of an engine 1 such as an internal combustion engine through the medium of an electromagnetic clutch 2.

A control unit 4 constituted by a microcomputer or microprocessor which is designed or programmed to serve for various arithmetic functions is provided for controlling operations of the engine 1, the electromagnetic clutch 2 and the multi-stage speed change gear unit 3 on the basis of information which can be derived from outputs of a variety of sensors and which indicates operating state of the engine 1.

A shift/select actuator 5 serves for driving or operating the synchromesh type multi-stage speed change gear unit 3 under the control of the control unit 4, while a shift/select position sensor 6 serves for detecting actual shift/select positions VY and VX, respectively, of the multi-stage speed change gear unit 3 to supply signals indicative of the shift/select positions as detected to the control unit 4.

The multi-stage speed change gear unit 3 is provided with an input shaft 22 to which a fourth speed gear (e.g. top speed gear) 23 functioning as a primary gear is directly coupled. Disposed sequentially in succession to the fourth speed gear 23 are a third speed gear 24, a second speed gear 25, a first speed gear (e.g. low speed gear) 26, a fifth speed gear (e.g. overtop speed gear) 27 and a reverse gear (also called the back gear) 28, respectively.

Further, a sleeve gear 29A is disposed between the fourth speed gear 23 and the third speed gear 24 with a sleeve gear 29B being disposed between the second speed gear 25 and the first speed gear 26 while a sleeve gear 29C is disposed between the reverse gear 28 and the fifth speed gear 27. Each of the sleeve gears 29A, 29B and 29C is directly coupled to an output shaft 30 of the multi-stage speed change gear unit 3 movably in the axial direction of the output shaft 20.

Further, the individual speed gears 23 to 28 constitute gear sets, respectively, together with gears mounted directly to a counter shaft 31 which is disposed in parallel with the output shaft 30, wherein each of the speed gears 23 to 28 is constantly set to the state meshing with the counterpart gear mounted on the counter shaft 31.

With the arrangement described above, the output shaft 30 is coupled operatively to a given one of the individual speed gears 23 to 28 through the medium of the sleeve gear 29A, 29B or 29C to be thereby coupled operatively to the input shaft 22.

As will be appreciated from the above, in the case of the synchromesh type automatic transmission system according to the instant embodiment of the invention, the multi-stage speed change gear unit 3 is implemented in the form of a counter shaft type five-stage variable speed gear drive which include five forward speed gear sets which differ from one to another in respect to the gear ratio, one set of reverse gear and three sleeve gears for changing over the gear mesh states from one to another.

An input rotation speed sensor 7 is provided in association with the fourth speed gear 23 mounted on the input shaft 22 for detecting an input rotation speed Ni (rpm). Further provided in association with the output shaft 30 is an output rotation speed sensor 8 for detecting an output rotation speed (rpm) of the multi-stage speed change gear unit 3 as a vehicle speed vr.

Installed within an intake pipe 9 of the engine 1 is a throttle valve 10 which is adapted to be driven by a throttle valve actuator 11. A throttle position sensor 12 is provided in association with the throttle valve 10 for detecting a throttle position or throttle opening degree θ thereof.

Furthermore, for detecting the depression stroke of an accelerator pedal (not shown) adapted to be manipulated by a driver of a motor vehicle, an accelerator pedal position sensor 13 is provided, wherein the output signal of the accelerator pedal position sensor 13 which indicates proportionally the depression stroke α of the accelerator pedal as actuated by the driver is supplied to the control unit 4.

The control unit 4 is programmed or designed to process the output signal of the accelerator pedal position sensor 13 to arithmetically determine a target or desired throttle valve opening degree θ o which conforms to the accelerator pedal depression stroke α, whereon the control unit 4 actuates or drives the throttle valve 10 by means of the throttle valve actuator 11 through a feedback control on the basis of deviation or difference between the desired throttle valve opening degree θ o and the detected throttle valve opening degree θ so that the actual throttle valve opening degree θ as detected coincides with the desired throttle valve opening degree θ o (i.e., θ=θ o).

Further, inputted to the control unit 4 is a shift lever position signal indicating the position (e.g. position P (Parking), position R (Reverse), position N (Neutral) or position D (Drive)) of a shift lever 14 which is manipulated by the driver of the motor vehicle.

An engine rotation speed sensor 15 serves for detecting a rotation number Ne (in rpm) of the engine 1, and the output signal of this sensor 15 is supplied to the control unit 4 as well.

A reverse gear switch 16 is provided in association with the reverse gear 28 of the multi-stage speed change gear unit 3 for detecting the operation status of the reverse gear 28.

Further provided is a brake switch 17 which is designed to output a signal indicating a brake pedal operating status, i,e., the state where the brake pedal (not shown) is being depressed by the driver. The output signal of the brake switch 17 is also supplied to the control unit 4.

The control unit 4 includes a speed stage control means designed or programmed for making decision as to speed change to thereby control the shift/select actuator 5 in dependence on the result of the speed change decision. Thus, a plurality of speed stages of the multi-stage speed change gear unit 3 can be changed automatically from one to another.

The speed stage control means incorporated in the control unit 4 is comprised of an acceleration/deceleration arithmetic means for determining arithmetically acceleration and deceleration of the motor vehicle on the basis of the vehicle speed and a deceleration discriminating means for comparing the deceleration with a predetermined deceleration value, wherein when it is decided that the brake switch 17 is in the actuated state (on-state) and that the deceleration is not greater than a predetermined deceleration value, the speed gear of the multi-stage speed change gear unit 3 which is acting at that time point is shifted to the neutral position, and thereafter the decision-making process as to the speed change is suspended.

On the other hand, when it is decided that the brake switch 17 is opened (i.e, off-state) or the vehicle speed becomes zero, the speed stage control means clears the speed change decision suspend state mentioned above to thereby allow the ordinary control functions to be resumed. Thus, the multi-stage speed change gear unit can be shifted to the speed stage which can be determined in accordance with the shift pattern (shift diagram) in dependence on the accelerator pedal depression stroke α and the vehicle speed Vr as detected.

Furthermore, when it is decided that the brake switch 17 is in the closed state (i.e., on-state) and that deceleration is not greater than the predetermined deceleration value, a sudden braking application flag FLAG is set. At the same time, the values of the sudden braking application flag FLAG in the preceding cycle or routine and in the current cycle or routine, respectively, are referenced and when it is detected that the value of the sudden braking application flag FLAG has changed from "0" to "1", then a neutral control flag FLN is set. On the contrary, when it is detected that the value of the sudden braking application flag FLAG has changed from "1" to "0", a reset flag FLR is set.

Figure 2:
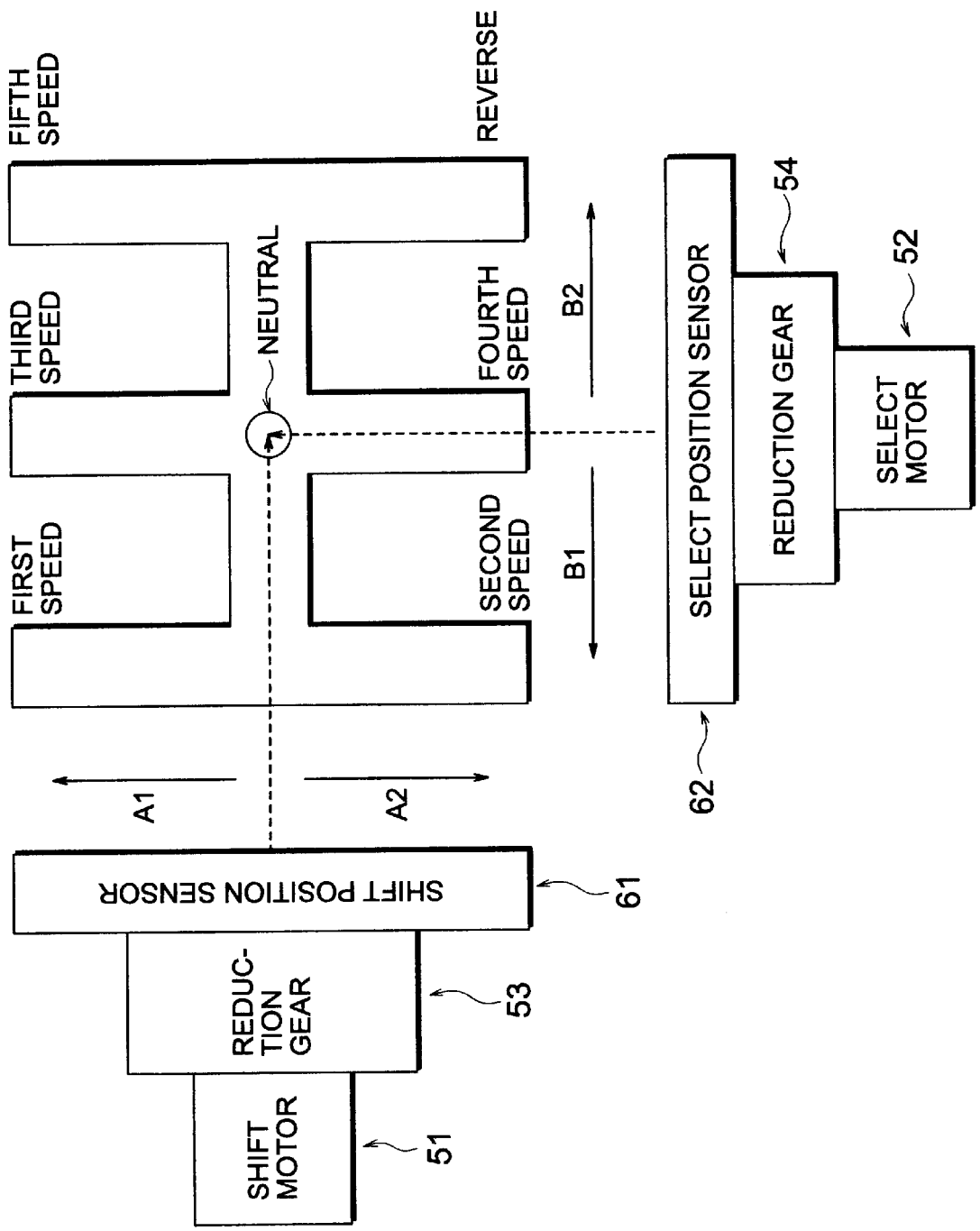
FIG. 2 is a schematic block diagram showing conceptually a relation between shift/select actuators and shift/select position sensors.

FIG. 2 is a schematic block diagram showing conceptually a relation between the shift/select actuators 5 and the shift/select position sensors 6.

Referring to FIG. 2, the shift/select actuator 5 is constituted by a shift motor 51, a select motor 52, a reduction gear 53 mounted on an output shaft of the shift motor 51 and a reduction gear 54 mounted on an output shaft of the select motor 52.

On the other hand, the shift/select position sensor 6 is comprised of a shift position sensor 61 provided in association with the shift motor 51 and the reduction gear 53, and a select position sensor 62 provided in association with the select motor 52 and the reduction gear 54.

The shift position sensor 61 is designed to detect positions in the directions extending from the origin corresponding to the neutral gear position, as indicated by arrows A1 and A2 in FIG. 2. Similarly, the select position sensor 62 is designed to detect positions in the directions extending from the origin corresponding to the neutral gear position, as indicated by arrows B1 and B2 in FIG. 2.

Figure 3:
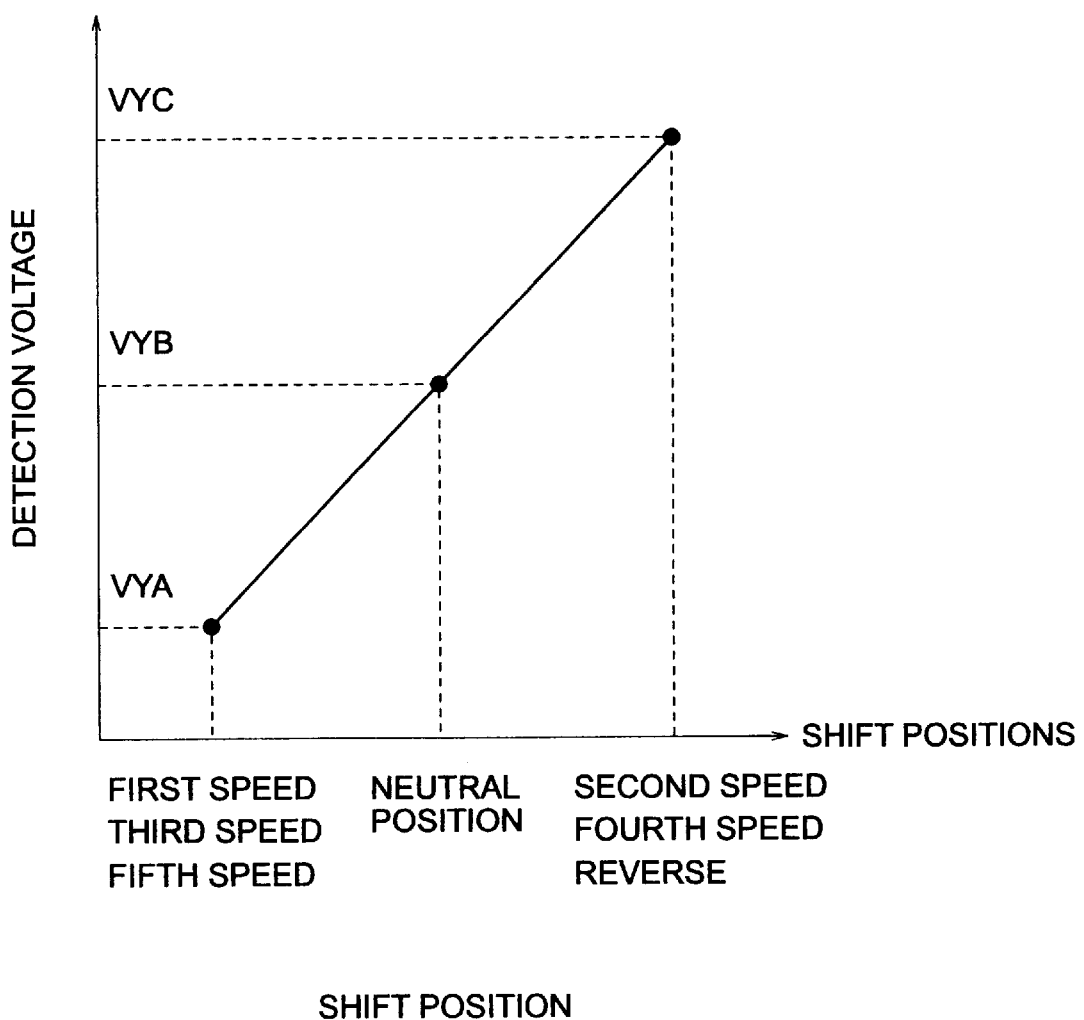
FIG. 3 is a characteristic diagram for graphically illustrating relations between shift positions detected by a shift position sensor shown in FIG. 2 and corresponding detection signals thereof.

FIG. 3 is a characteristic diagram for graphically illustrating relations between the shift positions detected by the shift position sensor 61 shown in FIG. 2 and corresponding detection signals (voltage values) VY thereof.

Referring to FIG. 3, VYA represents a learned voltage value indicating a shift position corresponding to the first, third or fifth speed stage, VYB represents a learned voltage value indicating a shift position corresponding to the neutral position, and VYC represents a learned voltage value indicating a shift position corresponding to the second or fourth speed stage or the reverse stage.

Figure 4:
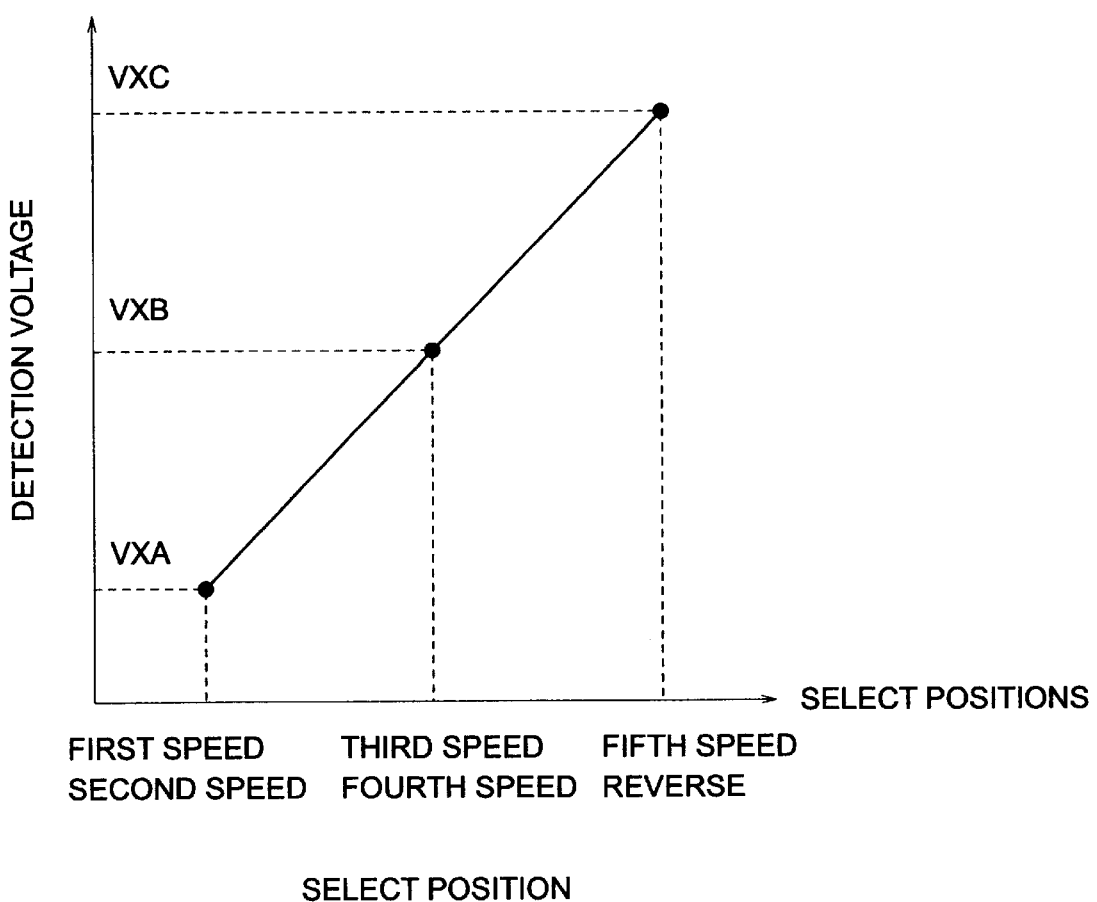
FIG. 4 is a characteristic diagram for graphically illustrating relations between shift positions detected by a select position sensor shown in FIG. 2 and corresponding detection signals thereof.

FIG. 4 is a characteristic diagram for graphically illustrating relations between select positions detected by the select position sensor 62 (FIG. 2) and corresponding detection signals (voltage values) VY thereof.

In FIG. 4, VXA represents a learned voltage value indicating a select position corresponding to the first or second speed stage, VXB represents a learned voltage value indicating a select position corresponding to the third or fourth speed stage (including the neutral position), and VXC represents a learned voltage value indicating a select position corresponding to the fifth speed stage or the reverse stage.

Now, description will be made in general of the speed change operation of the synchromesh type automatic transmission system according to the first embodiment of the invention shown in FIGS. 1 and 2.

The electromagnetic clutch 2 is driven pr electrically energized by a clutch exciting current of magnitude which is proportional to a clutch transmission torque (i.e., torque to be transmitted through the clutch 2) under the control of the control unit 4 to control transmission of torque or interruption thereof from the crank shaft 21 of the engine 1 to the input shaft 22 of the multi-stage speed change gear unit 3.

The shift/select actuator 5 selects the coupling state of the sleeve gears 29A, 29B or 29C under the control of the control unit 4 to thereby change over the speed stages of the multi-stage speed change gear unit 3. More specifically, the input torque to the multi-stage speed change gear unit 3 is first transmitted to the counter shaft 31 through the medium of the fourth speed gear 23 (primary gear) mounted on the input shaft 22.

In dependence on the selection of the speed gears or stages 24 to 28 disposed on the output shaft 30 to be meshed by the sleeve gear 29A, 29B or 29C, the torque transmission path and the gear ratio of the multi-stage speed change gear unit 3 (i.e., product of the gear ratio of the fourth speed stage 23 and that of the selected speed stage).

By way of example, when the sleeve gear 29A is brought into the state meshing with the fourth speed gear 23, the fourth speed stage is validated with the input shaft 22 being coupled to the output shaft 30 through the medium of the sleeve gear 29A.

Further, upon changing over the speed stages from one to another, releasing operation is first carried out for the sleeve gear 29A, 29B or 29C for releasing the relevant sleeve gear from the state meshing or engaging mechanically with the relevant gear of the speed stage acting currently, and then the coupling operation is performed for a relevant one of the sleeve gear 29A, 29B and 29C for causing it to mesh or engage with the gear of the speed stage to be validated in succession. In this conjunction, it should be mentioned that the state in which the sleeve gear 29C is meshing with the reverse gear 28 is detected by the reverse gear switch 16.

Inputted to the control unit 4 are the switch signal (shift signal) indicating the position of the shift lever 14 manipulated by the driver of the motor vehicle, a signal indicating the accelerator pedal depression stroke α as derived from the output of the accelerator pedal position sensor 13, a signal indicative of the engine rotation number (rpm) Ne derived from the output of the engine rotation speed sensor 15, a signal indicative of the vehicle speed Vr derived from the output of the output rotation speed sensor 8 and the switch signal indicating the brake position as derived from the output of the brake switch 17.

In response to these signals, the speed stage control means incorporated in the control unit 4 is so designed as to arithmetically determine the speed stage suited for the current vehicle running state of the motor vehicle in accordance with a gear shift pattern (not shown) of the multi-stage speed change gear unit by detecting the shift and select positions VY and VX from the output of the shift/select position sensor unit 6, to thereby output an appropriate control signal to the shift/select actuator unit 5.

In response to the control signal mentioned just above, the speed changeover operation of the multi-stage speed change gear unit 3 is realized by effectuating the releasing and coupling operations described previously.

Further, the synchronous state of the sleeve gear 29A, 29B or 29C in the speed stage changeover operation can be detected in terms of a mutual relation between the input rotation speed (rpm) Ni and the vehicle speed Vr.

Furthermore, in the speed stage changeover operation, the throttle valve 10 is closed to a predetermined throttle position or to a predetermined opening degree by means of the throttle valve actuator 11 with the exciting current for the electromagnetic clutch 2 being broken under the control of the control unit 4. Thus, the multi-stage speed change gear unit 3 is set to the so-called power-off state during the period in which the speed stage changeover (or speed gear changeover) operation is carried out.

In the shift control operation mode, the shift operation is carried out under the control of the control unit 4 by the shift motor 51 which is incorporated in the shift/select actuator 5 by way of the reduction gear 53 which is controlled in dependence on the signal indicative of the shift position VY as derived from the output of the shift position sensor 61 shown in FIG. 2 through a feedback loop.

Similarly, in the select control operation mode, the select operation is carried out under the control of the control unit 4 by the select motor 52 which is incorporated in the shift/select actuator 5 by way of the reduction gear 54 and which is controlled in dependence on the signal indicative of the select position VX as derived from the output of the select position sensor 61 shown in FIG. 2 through a feedback loop.

Figure 5:
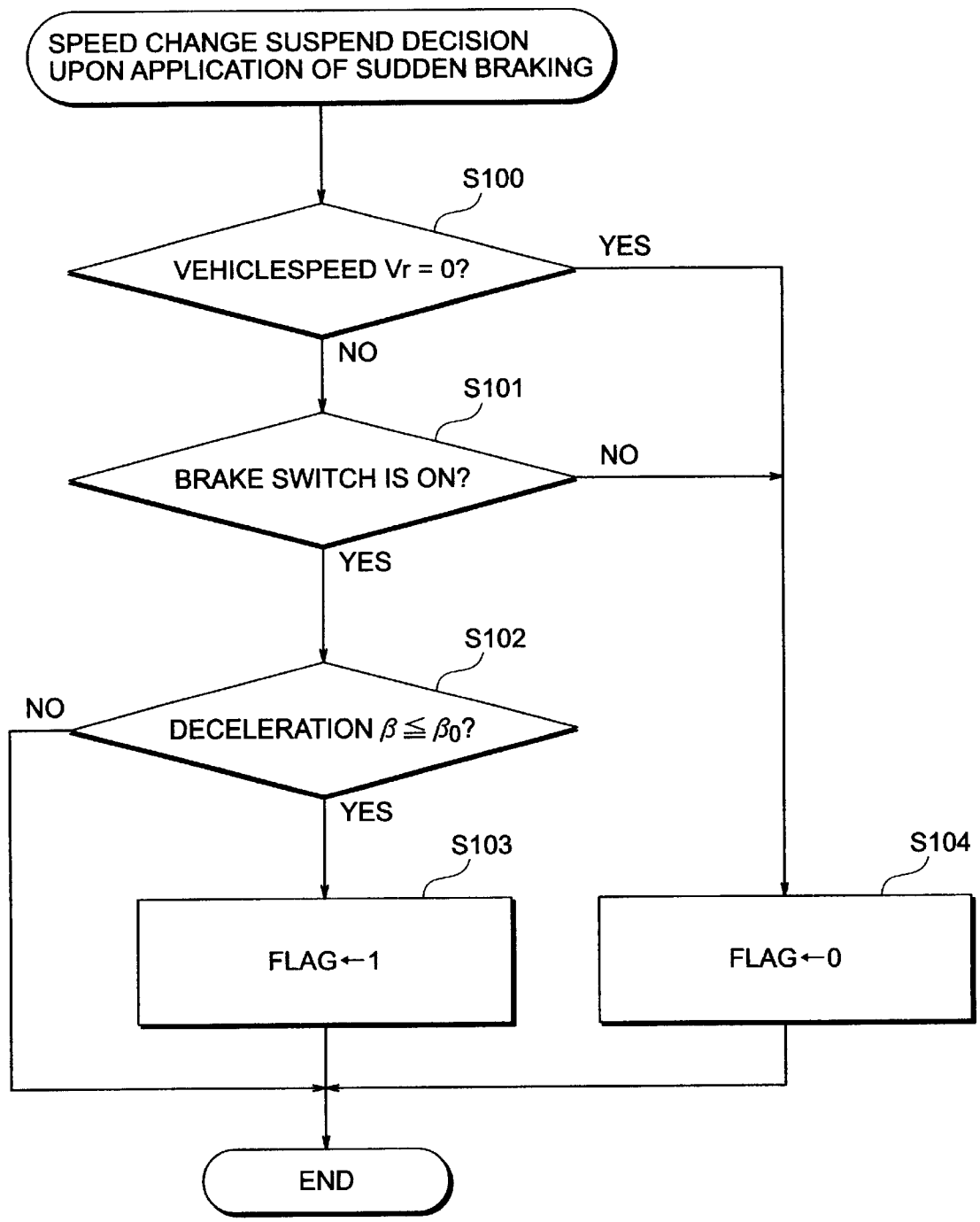
FIG. 5 is a flow chart for illustrating speed change suspend operation upon application of sudden braking.
Figure 6:
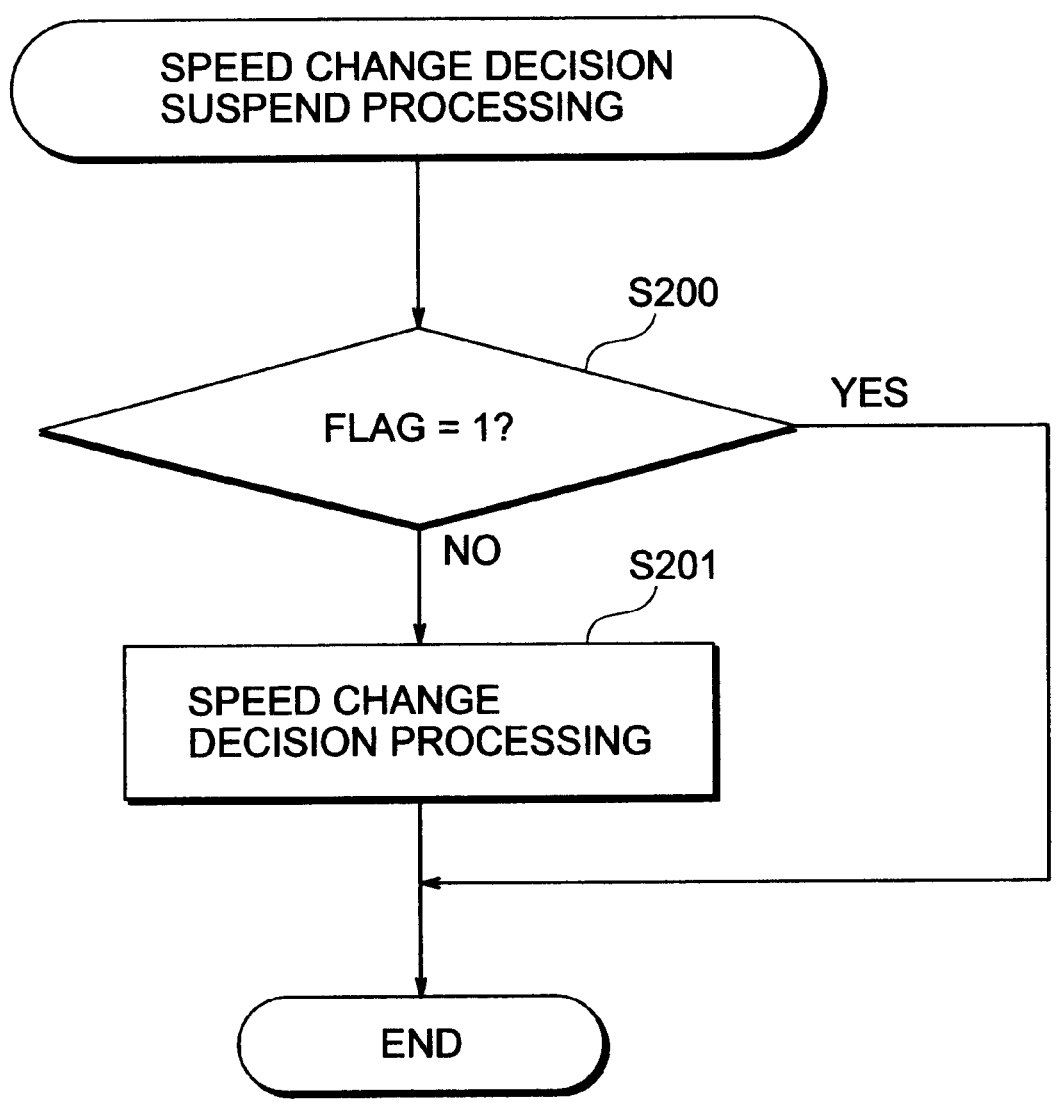
FIG. 6 is a flow chart for illustrating a speed change suspend decision procedure which is executed when application of sudden braking is decided.
Figure 7:
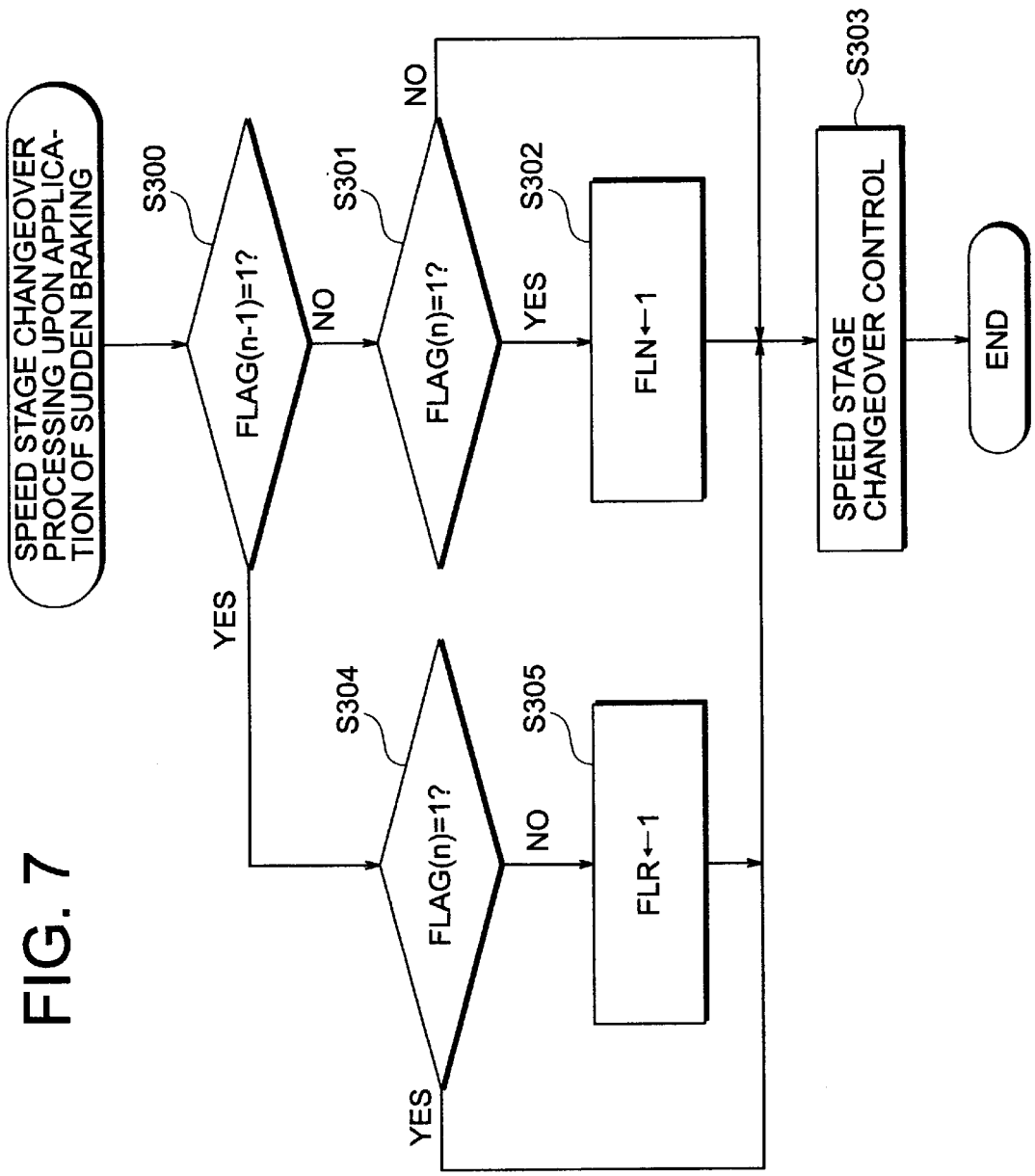
FIG. 7 is a flow chart for illustrating a processing procedure for speed or gear change control (neutral control) which is executed upon application of sudden braking.

Next, referring to FIGS. 5 to 7, description will be directed to operation of the control apparatus for the synchromesh type automatic transmission system shown in FIGS. 1 and 2 when sudden braking is applied. FIG. 5 is a flow chart for illustrating the speed stage changeover or speed change suspend operation (i.e., sudden braking application flag setting operation to say in another way) upon application of sudden braking.

Referring to FIG. 5, the control unit 4 makes decision as to whether or not the vehicle speed Vr is 0 km/h (step S100). When it is decided in the step S100 that the vehicle speed is zero (Vr=0) (i.e., when the decision in the step S100 results in affirmation "YES"), then the sudden braking application flag FLAG is cleared (step S104), whereon the processing routine illustrated in FIG. 5 comes to an end.

On the other hand, when it is decided in the step S100 that the vehicle speed vr is greater than zero or Vr>0 (i.e., when the decision step S100 results in negation "NO"), decision is then made in a step S101 as to whether or not the brake switch 17 is in the closed state (on-state).

When it is decided in the step S101 that the brake switch 17 is opened or in the off-state (i.e., when the decision step S101 results in negation "NO"), the processing proceeds to a step S104. By contrast, when it is decided in the step S101 that the brake switch 17 is closed or in the on-state (i.e., when the decision step S101 results in affirmation "YES"), decision is then made in a step S102 as to whether or not deceleration β at that time point is less than a predetermined value β o (where β o<0).

Parenthetically, the predetermined deceleration value β o mentioned above represents a permissible lower limit value of deceleration which allows the speed of the motor vehicle subjected to the speed change control to be shifted to lower speed stages successively (downshift). This value β o may previously be determined on the basis of the specifications of the motor vehicle such as output characteristics of the engine 1, the number of the speed stages of the multi-stage speed change gear unit 3 and so forth.

When it is decided in the step S102 that the deceleration β exceeds the predetermined deceleration value β o (i.e., when the decision step S102 results in negation "NO"), the processing routine shown in FIG. 5 is immediately terminated. By contrast, when decision is made in the step S102 that the deceleration β is not greater than the predetermined deceleration value β o inclusive or β≦β o (i.e., when the decision step S102 results in affirmation "YES"), the sudden braking application flag FLAG is set (step S103), whereupon the processing routine shown in FIG. 5 comes to an end.

FIG. 6 is a flow chart for illustrating a speed change suspend decision procedure or routine which is executed when the sudden braking application is decided.

Referring to FIG. 6, decision is firstly made by the control unit 4 in a step S200 as to whether or not the sudden braking application flag FLAG is valid (i.e., whether or not the sudden braking application flag is set to "1").

When it is decided in the step S200 that flag FLAG is in the state "0" or FLAG="0"(i.e., when the decision step S200 results in negation "NO"), the processing proceeds to a subroutine for the ordinary speed change decision processing (step S201). On the other hand, when it is decided in the step S200 that flag FLAG is set "1" or FLAG="1" (i.e., when the decision step S200 results in affirmation "YES"), the processing routine of FIG. 6 is terminated intactly.

FIG. 7 is a flow chart for illustrating a processing procedure for the speed change control (neutral control) which is executed upon application of the sudden braking.

Referring to FIG. 7, it is firstly decided by the control unit 4 in a step S300 as to whether or not a sudden braking application flag FLAG(n-1) has been set in the preceding routine (i.e., whether or not the sudden braking application flag FLAG(n-1) has been set to "1" in the routine executed in precedence to the current processing routine).

When decision is made in the step S300 that FLAG(n-1)="1" (i.e., when the decision step S300 results in affirmation "YES"), then it is decided whether or not a sudden braking application flag FLAG(n) is being set in the current routine (step S304).

More specifically, decision is made in the step S304 whether or not the current sudden braking application flag FLAG(n) is sustained in the state "1".

When decision is made in the step S304 that FLAG(n)= "0" (i.e., when the decision step S304 results in negation "NO"), this means that the sudden braking application flag FLAG has changed the state thereof from "1" to "0". Consequently, the reset flag FLR for resorting the speed change control from the neutral position is set to "1" (step S305), whereon the processing proceeds to a step S303.

On the other hand, when it is decided in the step S304 that FLAG(n)="1" (i.e., when the decision step S304 results in affirmation "YES"), this means that the sudden braking application flag FLAG is sustained to be "1". Consequently, the processing immediately proceeds to the step S303 to allow the speed changeover control to be carried out.

Further, when it is decided in the step S300 that FLAG (n-1) ="0" (i.e., when the decision in the step S300 results in negation "NO"), decision is then made as to whether or not the sudden braking application flag FLAG(n) is being validated in the current cycle or routine (step S301).

When it is decided in the step S301 that FLAG(n)="1" (i.e., when the decision step S304 results in affirmation "YES"), this means that the sudden braking application flag FLAG(n) has changed from "0" to "1". Consequently, the neutral control flag FLN is set to "1" (step S302), whereon the processing proceeds to the step S303.

On the other hand, when it is decided in the step S301 that FLAG(n)="0" (i.e., when the decision step S301 results in negation "NO"), this means that the sudden braking application flag FLAG is held in the state "0". Consequently, the processing immediately proceeds to the step S303, whereon the speed change control is carried out.

In the speed change control described above (step S303), the control unit 4 shifts the multi-stage speed change gear unit 3 to the neutral position in response to the neutral control flag FLN set to "1", which is then followed by clearing of the neutral control flag FLN.

Further, in the speed change control (step S303), the control unit 4 responds to the reset flag FLR set to "1" to thereby restore the speed change control while clearing the neutral state of the multi-stage speed change gear unit 3, whereon the reset flag FLR is cleared.

As will be appreciated from the foregoing, so far as the brake switch 17 is in the on-state and the deceleration β of the vehicle speed Vr is less than the predetermined deceleration value β o, the multi-stage speed change gear unit 3 is shifted to the neutral position so that decision as to the speed stage changeover operation can be suspended. As a result of this, execution of the downshift operation at a high frequency in response to the sudden braking application can positively be suppressed.

Thus, shock due to the speed change upon application of the sudden braking can be suppressed or mitigated, while occurrence of the so-called gear squeaking phenomenon which is ascribable to rapid gear synchronization in the multi-stage speed change gear unit 3 can be suppressed, which in turn contributes to enhancement or improvement of the comfortableness of driving the motor vehicle.

Besides, when it is detected or decided that the brake switch 17 is in the off-state or the vehicle speed Vr is zero, the state in which the decision as to the speed change is suspended is cleared with the ordinary speed change control procedure being resumed so that the vehicle speed can be changed to the speed stage determined in accordance with the shift pattern (shift diagram)) on the basis of the accelerator pedal depression stroke α and the vehicle speed Vr. In this way, as soon as the condition for allowing the speed change control is restored, accelerating operation of the motor vehicle can speedily be performed at the appropriate speed stage.

Many features and advantages of the present invention are apparent from the detailed description and thus it is intended by the appended claims to cover all such features and advantages which fall within the true spirit and scope of the invention. Further, since numerous modifications and combinations will readily occur to those skilled in the art, it is not intended to limit the invention to the exact construction and operation illustrated and described.

By way of example, it has been presumed in the foregoing description that the automatic transmission system has five speed stages and one reverse stage. However, the present invention is never restricted to such automatic transmission system. In other words, the present invention can find application to other type of automatic transmission system having a different number of speed stages.

Accordingly, all suitable modifications and equivalents may be resorted to, falling within the spirit and scope of the invention. Many modifications and variations of the present invention are possible in the light of the above techniques. It is therefore to be understood that within the scope of the appended claims, the invention may be practiced otherwise than as specifically described.

What is claimed is:

1. A control apparatus for a synchromesh automatic transmission system of a motor vehicle, comprising:

a shift/select actuator for driving a synchromesh multi-stage speed change gear unit;

a brake switch serving as a sensor for detecting a state where a brake pedal is depressed;

an accelerator pedal position sensor for detecting a depression stroke of an accelerator pedal as an accelerator pedal depression stroke;

an output rotation speed sensor for detecting a rotation speed of an output shaft of said multi-stage speed change gear unit as a vehicle speed; and speed stage control means for making decision as to speed change on the basis of detection signals outputted from said various sensors and controlling said shift/select actuator in dependence on the result of said decision, wherein a plurality of speed stages of said multi-stage speed change gear unit are automatically changed over from one to another, said speed stage control means comprising:

acceleration/deceleration arithmetic means for determining arithmetically acceleration and deceleration of said motor vehicle on the basis of said vehicle speed; and deceleration discriminating means for comparing said deceleration with a predetermined deceleration value, wherein when it is decided by said speed-change control means that said brake switch is in a closed state and that said deceleration is not greater than said predetermined deceleration value, said multi-stage speed change gear unit is shifted to a neutral position and thereafter said speed-change control means establishes a speed-change decision suspend state.

2. A control apparatus for a synchromesh automatic transmission system according to claim 1, wherein said speed change control means is so designed that when it is decided that said brake switch is in opened state or said vehicle speed is zero, said speed stage control means clears said speed change decision suspend state to thereby allow said multi-stage speed change gear unit to be shifted to the speed stage determined on the basis of said accelerator pedal depression stroke and said vehicle speed.

3. A control apparatus for a synchromesh automatic transmission system according to claim 1, wherein said speed change control means is so designed that when it is decided that said brake switch is in the closed state and that said deceleration is not greater than said predetermined deceleration value, a sudden braking application flag is set, and wherein values of said sudden braking application flag in a preceding cycle and a current cycle, respectively, are referenced and when it is detected that the value of said sudden braking application flag has changed from a reset state to a set state, then a neutral control flag for shifting said multi-stage speed change gear unit to the neutral position and holding said multi-stage speed change gear unit in the neutral position is set, and wherein when it is detected that the value of said sudden braking application flag has changed from said set state to the reset state, a reset flag for allowing said multi-stage speed change gear unit to restore an ordinary speed change control operation from said neutral position is set.

* * * * *